United States Patent [19]

Schmidt

[11] Patent Number: 4,673,356

[45] Date of Patent: Jun. 16, 1987

[54] IN-FLIGHT PROBLEM SITUATION SIMULATOR

[76] Inventor: Bruce C. Schmidt, 1211 Mohawk, DeRidder, La. 70634

[21] Appl. No.: 785,454

[22] Filed: Oct. 8, 1985

[51] Int. Cl.$^4$ .............................................. G09B 9/08
[52] U.S. Cl. ...................................... 434/35; 434/49
[58] Field of Search .................. 434/35, 36, 49, 243, 434/30, 45; 446/7, 230

[56] References Cited

U.S. PATENT DOCUMENTS

| | | | |
|---|---|---|---|
| D. 249,046 | 8/1978 | Bowman | D19/63 |
| 2,331,605 | 10/1943 | Gold | 434/45 X |
| 2,398,724 | 4/1946 | Schultz | 434/49 |
| 3,471,942 | 10/1969 | Weitzman et al. | 434/49 X |
| 3,546,350 | 12/1970 | Reynolds | 434/243 |
| 3,680,230 | 8/1972 | Thompson | 434/30 X |
| 3,702,504 | 11/1972 | Cramer | 434/49 X |
| 3,800,467 | 4/1974 | Brenner | 446/7 |
| 4,470,819 | 9/1984 | Seay et al. | 434/49 |
| 4,490,117 | 12/1984 | Parker | 434/35 |

FOREIGN PATENT DOCUMENTS 1500263 2/1978 United Kingdom ................. 434/49

Primary Examiner—William H. Grieb
Attorney, Agent, or Firm—Tom F. Pruitt

[57] ABSTRACT

An apparatus for simulating in-flight problem situations is provided. The apparatus comprises a false instrument display surface which has a false instrument reading and is adapted to cover and obscure a true instrument reading in such manner that a pilot views the false instrument reading. A method of simulating in-flight problem situations during flight in a airplane having a pilot and an instructor is also provided and uses a display of a false instrument reading.

10 Claims, 4 Drawing Figures

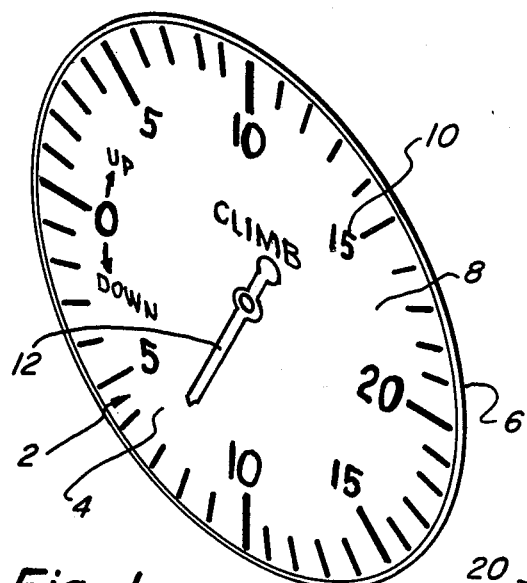
Fig_1
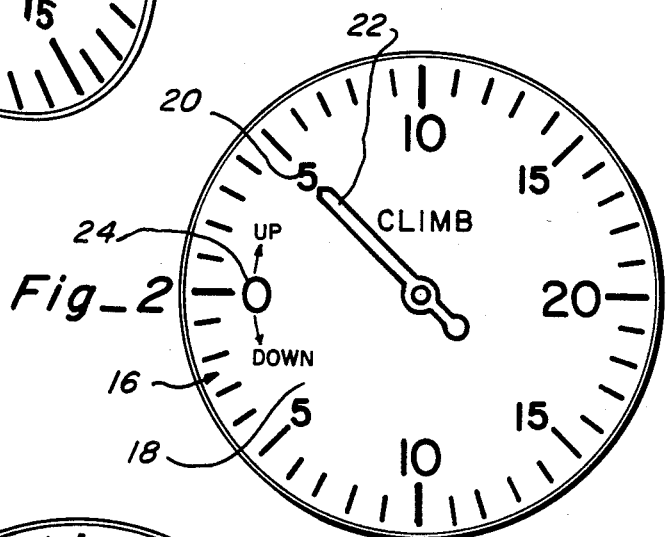
Fig_2
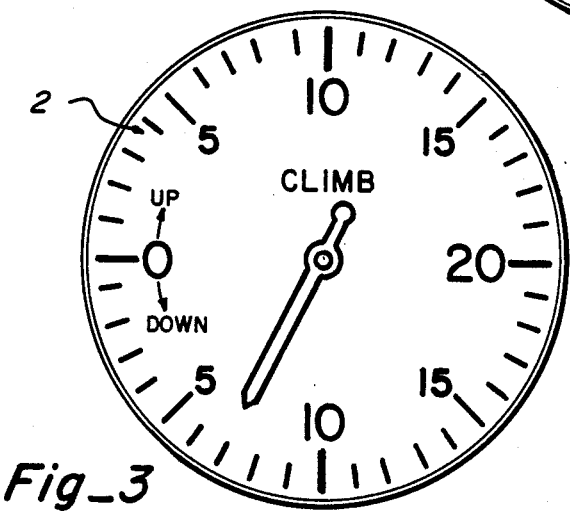
Fig_3

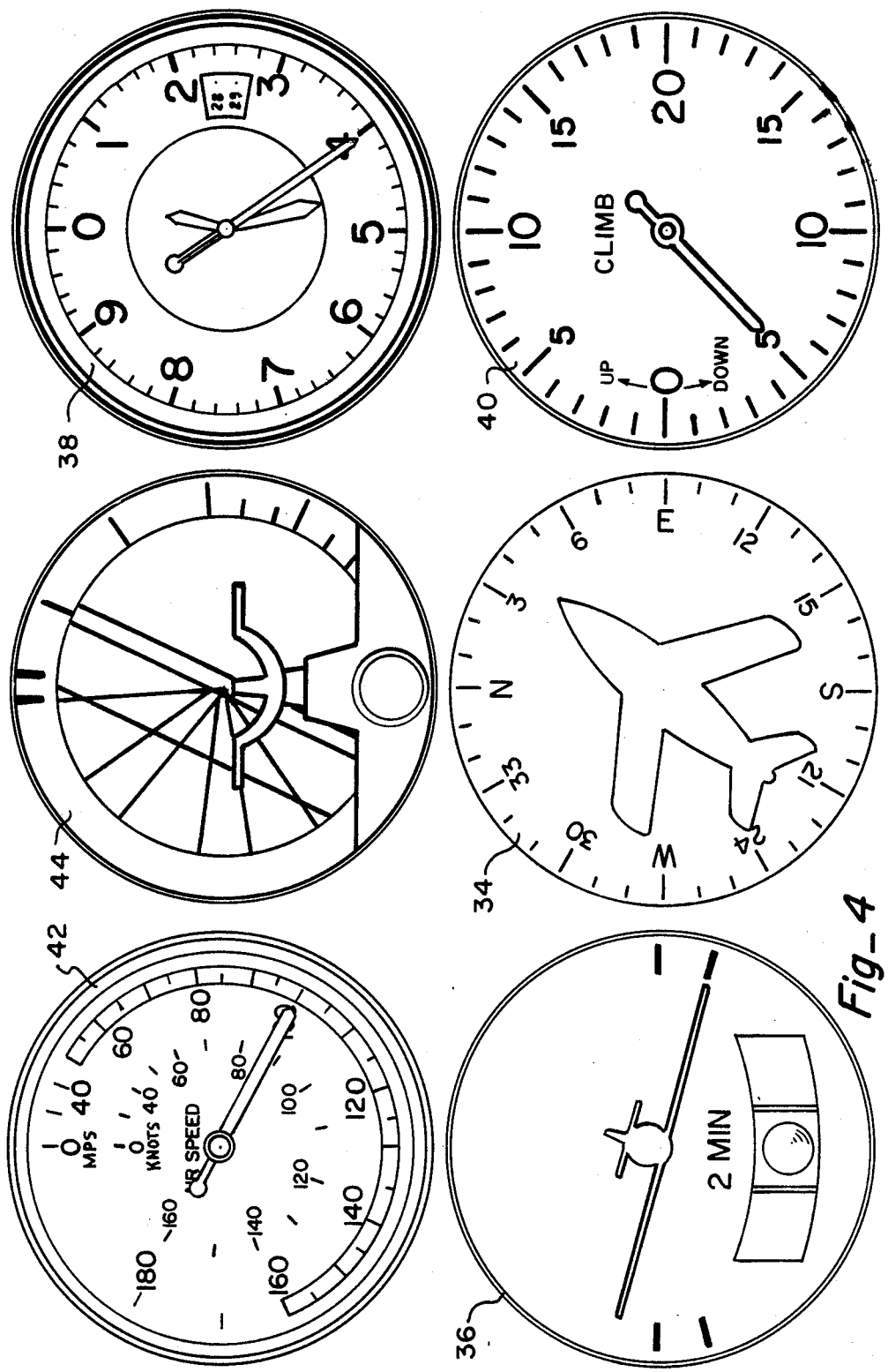
Fig_4

IN-FLIGHT PROBLEM SITUATION SIMULATOR

FIELD OF THE INVENTION

This invention relates to a method of simulating in-flight problem situations, particularly those situations caused by erroneous flight instrument readings and malfunctions of engine or other equipment. This invention also relates to an apparatus for simulating in-flight problem situations.

BACKGROUND OF THE INVENTION

Flight instruments provide a pilot with information reflecting the overall attitude of his aircraft. By proper use of certain flight instruments, a pilot generally can fly his airplane without external visual references. Flight instruments include equipment gauges and indicators which provide a pilot with information reflecting the status of critical engine systems and components. By proper use of these gauges and indicators, a pilot generally can ascertain the current condition of equipment systems.

Flight instruments commonly used include an artificial horizon (attitude gyro); a heading indicator (directional gyro); an altimeter; an air speed indicator; a vertical speed indicator; and a turn coordinator (turn and slip indicator). As used in the specification and claims, flight instruments include equipment gauges and indicators, such as indicator lights. Flight equipment gauges and indicators typically employed include indications of engine oil pressure; engine oil temperature; engine cylinder head temperature; engine speed (tachometer); electrical system battery charge (ammeter); fuel level; and vacuum system gauge.

Problem situations can occur during flight when malfunctions occur with electrical, fuel, vacuum or engine systems. Problem situations also can occur during flight when one or more flight instruments malfunction or otherwise provide incorrect information to the pilot. Air safety would be improved if all pilots were adequately trained to properly recognize and react to inflight problem situations involving systems' malfunctions and erroneous instrument readings. Flight simulators known in the art are expensive and are not available to all flight instructors in all areas.

SUMMARY OF THE INVENTION

It is an object of this invention to provide a method for simulating in-flight problem situations. It is another object of this invention to provide an apparatus for simulating inflight problem situations. A further object of this invention is to provide a safe and effective method to instruct pilots to recognize and properly react to in-flight problem situations, particularly those situations caused by erroneous instrument readings and systems' malfunctions. A still further object of this invention is to provide an in-flight problem situation simulator apparatus that is relatively low cost and easy to use.

These and other objects, embodiments, details, features and advantages of this invention will become apparent to those skilled in the art from the following detailed description, the appended claims and the drawings in which:

FIG. 1 shows a false instrument display surface of this invention, displaying a false instrument reading;

FIG. 2 shows a true instrument display surface, displaying a true instrument reading corresponding to and appearing identical to the false instrument display surface of FIG. 1, except that the false and true readings are different.

FIG. 3 is an illustration of the false instrument display surface of FIG. 1, covering and obscuring the true instrument display surface of FIG. 2; and FIG. 4 is an illustration of an in-flight problem situation, with an instrument panel having a false artificial horizon display.

I have discovered a valuable new in-flight training apparatus for simulating flight problems and emergencies during actual flight or as otherwise set forth herein, which allows a pilot to experience a realistic problem or emergency situation under a controlled and supervised condition and to develop correct problem detection, analysis and reaction procedures. I have also discovered a new method of in-flight training which permits a flight instructor to observe a pilot's ability to detect, analyze and take proper corrective action to an in-flight problem situation. I have found that a false instrument display surface, having a false instrument reading, can be adapted to cover a true instrument display surface to obscure the true instrument reading and to give the visual indication of a false instrument reading. I have found that the false display surfaces which cover the actual instrument indications can simulate instrument failure, engine malfunction or malfunction of electrical, vacuum or other systems. I have also found that the inflight situation simulation of this invention provides a new method of instruction and learning problem awareness heretofore unavailable to the general aviation pilot. By use of this invention, a pilot can visually experience, in an aircraft under actual flight conditions, instrument indications which would be displayed during real systems' failures and other problem situations and emergencies.

In accordance with a first embodiment of this invention, an apparatus for simulating in-flight problem or emergency situations is provided. An in-flight training apparatus for simulating in-flight problem situations within an airplane having one or more actual or true instruments comprising a true instrument display surface which displays the actual or true instrument reading. The in-flight training apparatus comprises a false instrument display surface, comprising a rear portion and a front portion, which front portion displays a false instrument reading different from the true instrument reading of the actual instrument. The false instrument display surface is adapted to attach to and substantially cover the true instrument display surface, to obscure the true instrument reading and to display the false instrument reading to simulate a problem situation.

In one variation of this embodiment of this invention, the false instrument display surface is substantially identical in appearance to the true instrument display surface except for the false instrument reading being different from the true instrument reading. In this variation, the false instrument cover is a replica or duplicate of the true instrument face, except as to the false indication display. A pilot observing the false instrument cover of this variation could not by simple visual examination determine that the true instrument had been covered and that a false or erroneous display had replaced the actual or true display. The in-flight problem simulation apparatus of this variation is useful in those instances where an instructor would desire to obscure an instrument to simulate a problem situation in such manner that the problem would appear spontaneously when the false instrument display was first observed. The identical or replica false display would not be visually distinguishable from the true display.

In another variation of this embodiment of this invention, the false instrument display surface is visually distinguishable from the true instrument surface, in addition to having a false instrument reading different from the true instrument reading. In this variation, the false instrument cover is a replica or duplicate, except that it is distinguishable in having a different color of background, numerals or lettering, containing a visually distinguishable pattern or border; or having such other distinguishing features as are apparent now from this disclosure to those skilled in the art. A pilot observing the false instrument cover of this variation could determine by visual observation that a false instrument cover was in place. The in-flight problem simulation apparatus of this variation is useful in those instances where an instructor wished to display an obvious false reading for discussion purposes or for other training reasons.

The in-flight training problem simulator apparatus of this invention would preferably comprise false instrument display surfaces, having false instrument readings indicating engine oil pressure at zero; engine oil pressure abnormally high; engine oil temperature abnormally hot; electrical system (ammeter) abnormal discharge; electrical system (ammeter) abnormal charge; vacuum system abnormal low vacuum or zero pressure; and fuel gauge measurement errors, including three-quarters, one-half, one-fourth and empty tank levels and variations thereof.

The in-flight training problem simulation apparatus of this invention would also preferably comprise false artificial horizon instrument display surfaces, having false instrument readings indicating (i) climbing at 10 degrees pitch, wings level; (ii) climbing at 15 degrees pitch, 30 degrees right bank; (iii) climbing at 5 degrees of pitch, 30 degrees left bank; (iv) zero degrees of pitch, 90 degrees left bank; (v) descending at 15 degrees of pitch, 110 degrees right bank; (vi) zero degrees of pitch, zero degrees of bank; (vii) descending at 10 degrees of pitch, 20 degrees right bank; (viii) descending at 15 degrees of pitch, 45 degrees left bank; and (ix) descending at 10 degrees of pitch, zero degrees of bank.

The simulation apparatus of this invention further preferably comprises false turn coordinator instrument display surfaces, indicating left turn, right turn and wings level (no turn). The apparatus further preferably comprises false airspeed indicator instrument display surfaces, indicating zero airspeed, 60 knots and 100 knots. Additional specifically preferred apparatus comprises a false directional gyro card. Other preferred apparatus comprises false engine speed (tachometer) display surface, showing zero or other abnormal engine revolutions per minute.

While the foregoing sets forth certain preferred variations of the in-flight training problem simulation apparatus of this invention, those skilled in the art understand that additional variations and combinations are within the scope of this invention. For example, a false artificial horizon indicating zero degrees of pitch and 10 degrees right bank could be useful, as well as a false air-speed indicator indicating 80 knots, and the like. The foregoing preferred variations are, therefore, not to limit the scope of this invention.

In another preferred variation of this embodiment of this invention, the rear portion of the false instrument display surface comprises a rigid backing means and an adhesion device means adapted to attach the rear portion of the false instrument display to the true instrument display surface. The rigid backing means can be any suitable backing means known in the art. The backing means is preferably a thin, rigid and lightweight sheet comprising a rigid metal or a plastic backing means having a cross-sectional area substantially equal to that of the false instrument display surface and having a thickness sufficient to maintain rigidity. The false instrument display surface may be attached to the rigid backing or may be integrated into the rigid backing by being painted thereon. The adhesion device means can be any suitable adhesion device means known in the art. Preferable adhesion device means include a suction cup, tape, a magnet and other adhesion device means.

In a still more preferred variation of this embodiment of this invention, the rear portion of the false instrument display surface comprises a flexible composition adapted to adhere to the true instrument display surface by a natural surface cohesive action. True instrument display surfaces often comprise relatively smooth glass, poly-methylmethacrylate or other transparent compositions. In this variation, the false instrument display surface attaches to the true instrument display surface without the use of an adhesive device means such as a suction cup, tape or a magnet. The attachment is by means of a natural affinity between the two surfaces resulting from the characteristics of the materials involved. Flexible compositions which have a natural surface cohesive action to glass or polymethylmethacrylate are well known in the art and include various products of viscose such as cellophanes, various synthetic rubbers and various plastic-type materials made from vinyl resins. In this variation, the false instrument display surface preferably comprises the flexible composition as one unit, with false instrument readings drawn, painted, or placed by decal or otherwise upon the front portion of the false instrument display surface, with the rear portion being available for attachment to the true instrument display surface.

The term "in-flight", as used in the claims and in the above description of the training apparatus and the following description of the training method, is intended to include ground training simulation of in-flight conditions wherein the apparatus and method are applied to instruments in actual aircraft or to actual instruments outside of aircraft.

In another embodiment of this invention, an in-flight method of simulating in-flight problems is provided for use in an airplane having a pilot and an instructor. The method comprises covering a true instrument display surface with a false instrument display surface, having a false instrument reading and obscuring the reading of the true instrument display surface. By using this method, an instructor can cover one or more true instrument readings to display false readings and can simulate actual in-flight problem situations. The true instrument display surfaces may be covered without the pilot being aware the instruments are being covered. In one variation, the false instrument display surfaces are substantially identical to the true instruments, except for the false instrument reading being different from the true instrument reading. The pilot can be unaware that the instructor covers the true reading to display a false problem or emergency. In this variation, the problem situation being simulated will appear to the pilot to occur spontaneously when the pilot observes the false instrument display surface reading. The instructor may evaluate the pilot's ability to detect, analyze and properly react to the simulated problem situation. In another variation, the instructor may act to cover a true reading with a false reading, with the pilot being aware of the instructor's actions, in order to cause the visual appearance of a problem situation for discussion or other purposes. In other preferred variations of the training method of this invention, the false instrument display surface can be made to be visually distinguishable from the true instrument display surface in addition to the false instrument reading being different from the true instrument reading.

Further additional embodiments of this invention are described in the drawings, in which FIG. 1 shows a false instrument display surface of this invention. The false instrument display surface 2 comprises a front portion 4 and a rear portion 6. The display surface 2 of FIG. 1 is a false vertical speed indicator having a face surface color 8, numerals 10 and display needle 12, identical to a true vertical speed indicator. The false vertical speed indicator 2 has a false instrument reading, indicating a descent since the needle 12 points below the zero origin (up/down) of the false indicator 2.

FIG. 2 shows a true instrument display surface. The true instrument display surface 16 is also a vertical speed indicator having a face surface color 18, numerals 20 and display needle 22, identical to the false indicator 2. The true indicator 16 has a true instrument reading, indicating a climb, since the needle 22 points above the zero origin 24 of the true indicator 16.

FIG. 3 shows the false instrument display surface 2 of FIG. 1, covering the true instrument display surface 16 of FIG. 2 (not shown in FIG. 3). The true instrument display surface 16 of FIG. 2 is obscured by the false instrument display surface 2 of FIG. 1. A pilot observing FIG. 3 would observe the false reading of descent of the false instrument display surface and could not see the true instrument display surface. The false display 2 is a replica of the true display 2, except that the false display displays a false reading of descent.

FIG. 4 shows an instrument panel typically found in an airplane, using a problem situation simulator to create a visual appearance of a critical situation. The panel of FIG. 4 includes a true directional gyro 34 which indicates a right turn, and a true turn coordinator 36 which also indicates a right turn.

The panel also contains a true altimeter 38 and a true vertical velocity indicator 40, both of which under the circumstances indicate a descent. The panel further contains a true airspeed indicator 42, which under the circumstances indicates increasing airspeed. The panel would include a true vacuum gauge (not shown) which reads normal pressure. The panel of FIG. 4 further includes a false instrument display surface 44 covering the true display surface (not shown) of an artificial horizon instrument. The false display 44 shows a descent at 15 degrees of pitch and 110 degrees of right bank. A pilot viewing the panel of FIG. 4 is confronted with a problem situation. The pilot must correctly interpret the instruments to avoid potential danger. The panel of FIG. 4 is further discussed in Example VI below.

The following examples are intended to further illustrate the invention without undue limitation of scope.

EXAMPLE I

PITOT SYSTEM FAILURE

During actual flight and while the airplane is in a safe pattern, a situation simulator apparatus is used by a flight instructor to cover the true or actual airspeed indicator. The false instrument display reading of the simulation apparatus presents visual indications of zero airspeed. Actual airspeed is clearly not zero, and the pilot is presented with a simulated problem situation.

The instructor may observe the amount of time required for the pilot to detect the problem situation and may observe the manner in which the student reacts to the problem situation. The instructor may observe whether or not the pilot uses known pitch attitudes and power settings to maintain airspeed. Also, the instructor can observe or suggest taking other actions, such as turning on the pitot heater or, if justified by the circumstances, landing to evaluate or maintain the equipment.

EXAMPLE II

VACUUM SYSTEM FAILURE

During actual flight and while the pilot is using an instrument training hood which shields his vision of the area outside of the airplane, the pilot is instructed to momentarily close his eyes while the instructor places the airplane in an unusual attitude. Situation simulator apparatus are used by the instructor to cover the suction gauge, artificial horizon and directional gyro to present the problem situation discussed below. The instructor places the airplane in a descending left turn, and the pilot is told to recover the airplane to a level flight attitude. The pilot's visual indications, considering the false instrument display readings of the simulation apparatus, are as follows:

a. airspeed is increasing;
b. turn coordinator shows a left turn;
c. altimeter and vertical velocity instruments show a descent;
d. vacuum gauge (false) reads zero;
e. artificial horizon (false) is frozen, indicating a climbing right turn; and
f. direct gyro (false) is frozen and indicates no turn.

Within a few seconds, the pilot must recognize that an increasing airspeed does not correspond to a "nose high" altitude of the aircraft. The pilot must suspect the visual indications from the artificial horizon. The pilot should use the turn coordinator as his primary reference to level the wings and should use airspeed and altimeter (or vertical speed) indications as his pitch reference. After the pilot has placed the aircraft in level flight, the situation simulator apparatus will still present false information from all vacuum instruments. In actual instrument flight conditions, a pilot, who is unable to rapidly recognize and react to the problem situation as presented in the above simulation, will generally crash.

EXAMPLE III

IMPENDING ENGINE FAILURE

During flight and while the pilot is not observing the instrument panel, the instructor places situation simulator apparatus to cover oil pressure, oil temperature and cylinder head gauges. False instrument readings of (i) zero oil pressure; (ii) high oil temperature; and (iii) high cylinder head temperature are displayed by the false instrument display surfaces. The instructor can observe the amount of time required by the pilot to detect the problem situation. If the pilot does detect the problem within a proper period of time, the instructor may elect to have the pilot proceed with normal checklist and emergency procedures, including selection of a suitable emergency landing site.

EXAMPLE IV

FUEL SYSTEM MALFUNCTION

After the pilot has fueled his aircraft just prior to a cross-country flight, the instructor places a situation simulator apparatus to cover the left fuel gauge to indicate a false reading of "half full". The right gauge (actual) displays a reading of "full", and the left gauge (false) displays a reading of "one-half full". The instructor may observe the amount of time required for the pilot to detect the problem. The pilot may be trained in various alternative actions such as returning to his starting point, if possible, to have the problem examined, landing at a suitable alternate point to check for a lost fuel cap and other possible causes, or to switch fuel tanks or take other corrective actions.

EXAMPLE V

ENGINE OVERHEAT

During flight and while the pilot is not observing the instrument panel, the instructor places a situation simulator apparatus to cover the cylinder head temperature gauge. The false instrument display surface shows a reading of very high cylinder head temperatures. The instructor may observe the amount of time required for the pilot to detect the problem. The instructor may observe or discuss the corrective actions to be taken such as reducing power, opening cowel flaps, increasing airspeed and monitoring other engine instruments, as well as other emergency procedures.

EXAMPLE VI

METHOD OF INSTRUCTING INSTRUMENT INTERPRETATION

During actual flight and while the pilot is using an instrument training hood which shields his vision of the area outside of the airplane, the pilot is instructed to momentarily close his eyes while the instructor places the airplane in an unusual attitude. Situation simulator apparatus are used by the instructor to cover the artificial horizon to present the problem situation discussed below. The instructor places the aircraft into a descending right turn at 30 degrees of bank. The pilot's visual indications, considering the false instrument display reading of the simulation apparatus, are as follows:
  a. airspeed is increasing;
  b. turn coordinator shows a right turn;
  c. altimeter and vertical velocity instruments show a descent;
  d. vacuum gauge reads normal vacuum;
  e. directional gyro shows a right turn; and
  f. artificial horizon (false) shows a descent at 150 degrees of pitch and 110 degrees of right bank.

Within a few seconds, the pilot must correctly interpret the instrument conflict and apply left aileron and rudder pressure to avoid a simulated potential danger. If the pilot rolls right, he has misinterpreted the problem situation. Under actual instrument conditions, the misinterpretation by the pilot could lead to an accident. This Example VI shows that an instructor can safely use the method of in-flight instrument training of this invention to teach a pilot how to correctly recover from a potentially dangerous problem situation. The aircraft was only placed in a safe 30 degrees right bank to present the problem situation for detection and action.

EXAMPLE VII

OIL SYSTEM MALFUNCTION

During flight and while the pilot is not observing the instrument panel, the instructor places a situation simulator apparatus to cover the oil pressure gauge. The false instrument display surface indicates high or low oil pressure, as may be selected by the instructor. The instructor may observe the amount of time required for the pilot to detect the problem. The instructor may observe to determine if the pilot monitors other engine instruments for information to confirm the malfunction of the engine oil system or to determine the problem situation resulting from a gauge failure. The instructor may also discuss checklist procedures with the pilot and other corrective actions, including finding a suitable emergency landing site.

Reasonable variations and modifications, which will become apparent to those skilled in the art, can be made in this invention without departing from the spirit and scope thereof.

What is claimed is:

1. An in-flight training apparatus for instructing pilots to recognize and properly react to in-flight problem situations and for simulating in-flight problem situations within an airplane having a true instrument comprising a true instrument display surface which displays a true instrument reading, said in-flight training apparatus comprising a false instrument display surface comprising a rear portion and a front portion, which front portion displays a false instrument reading different from the true instrument reading, said false instrument display surface being adapted to attach to substantially cover the true instrument reading and to display the false instrument reading to simulate a problem situation by covering and obscuring the true instrument display surface.

2. An in-flight training apparatus in accordance with claim 1, wherein said false instrument display surface is substantially identical in appearance to said true instrument display surface except for said false instrument reading being different from said true instrument reading.

3. An in-flight training apparatus in accordance with claim 1, wherein said false instrument display surface is visually distinguishable from the true instrument display surface, in addition to having a false instrument reading different from the true instrument reading.

4. An in-flight training apparatus in accordance with claim 1, wherein the rear portion of the false instrument display surface comprises a rigid backing means and an adhesion device means attached to the rigid backing means, said adhesion device means adapted to attach the rear portion of the false instrument display surface to the true instrument display surface.

5. An in-flight training apparatus in accordance with claim 1, wherein the rear portion of the false instrument display surface comprises a flexible composition adapted to adhere to the true instrument display surface by surface cohesive action.

6. An in-flight method for instructing pilots to recognize and properly react to in-flight problem situations and for simulating in-flight problem situations within an airplane having a pilot and an instructor and having a true instrument comprising a true instrument display surface which displays a true instrument reading, said method comprising covering the true instrument surface with a false instrument display surface having a false instrument reading which is different from the true instrument reading, said false instrument surface covering and obscuring the reading of the true instrument display surface.

7. A method in accordance with claim 6, wherein the false instrument display surface is substantially identical to the true instrument display surface, except that the false instrument reading is different from the true instrument reading.

8. A method in accordance with claim 6, wherein the false instrument display surface is visually distinguishable from the true instrument display surface, in addition to the false instrument reading being different from the true instrument reading.

9. A method in accordance with claim 6, wherein the instructor acts to cover the true instrument display surface with the false instrument display surface, with the pilot being unaware of the act of the instructor.

10. A method in accordance with claim 6, wherein the instructor acts to cover the true instrument display surface with the false instrument display, with the pilot being aware of the act of the instructor.

* * * * *